United States Patent [19]

Swope

[11] 3,805,485

[45] Apr. 23, 1974

[54] PACKAGING MACHINE

[75] Inventor: Jack G. Swope, Eckford Township, Calhoun County, Mich.

[73] Assignee: Rennco Incorporated, Homer, Mich.

[22] Filed: Oct. 5, 1972

[21] Appl. No.: 295,177

[52] U.S. Cl.................... 53/182, 156/498, 156/515
[51] Int. Cl........................ B65b 9/08, B65b 51/32
[58] Field of Search ............... 53/28, 180, 182, 167; 156/215, 498, 515

[56] References Cited
UNITED STATES PATENTS

| | | | |
|---|---|---|---|
| 3,209,513 | 10/1965 | Cochrane............................. | 53/182 |
| 3,340,129 | 9/1967 | Grevich ............................ | 53/182 X |
| 3,501,887 | 3/1970 | Umholtz et al. .................. | 53/182 X |

Primary Examiner—Robert L. Spruill
Attorney, Agent, or Firm—Woodhams, Blanchard and Flynn

[57] ABSTRACT

A packagng machine having means for supporting a roll of folded plastic film and a drive mechanism for causing a predetermined length of film to be advanced downwardly past stationary guide structure mounted on the machine. An inlet conveyor device is associated with the stationary guide structure, and includes an elevating mechanism for permitting articles to be moved, one at a time, between the overlapping layers of plastic film which partially surround the stationary guide structure. A pair of L-shaped clamping members are movably mounted on the machine directly below the stationary guide structure and are relatively movable toward one another to clamp the plastic film therebetween. An L-shaped knife having a heated blade is movably positioned within one of the clamping members and engages the film for cutting and heat-sealing a horizontal and a vertical edge of the film to permit formation of a closed and sealed plastic bag in surrounding relationship to the article. The opposed clamping members have hollow interiors which communicate with one another when the clamping members are in engagement with the plastic film. One end of one clamping member is connected to a source of air, such as the surrounding atmosphere, and the opposite end of the other clamping member is connected to a blower or the like for enabling cooling air to be forced or drawn through the members and across the heated and sealed edges of the plastic film to cause rapid cooling of the sealed edges and withdrawal of the fumes and vapors generated during the sealing operation.

10 Claims, 16 Drawing Figures

PACKAGING MACHINE

FIELD OF THE INVENTION

This invention relates to an improved packaging machine and, in particular, to an improved machine for forming a bag from a thermoplastic film and for closing and sealing the bag after the contents have been inserted therein.

BACKGROUND OF THE INVENTION

Machines for forming plastic bags and for closing and sealing the bags in surrounding relationship to an object have been known and utilized for a substantial period of time. However, these known machines have possessed various disadvantages which have severely limited their adoption and utilization.

Particularly, due to the time required for cooling the seals to effect hardening and strengthening of the plastic material at the sealed edges of the bag, the rate at which the bags are formed in the known machines has been severely limited. In an attempt to permit more rapid cooling and hardening of the sealed edges, various structures have been devised in an attempt to facilitate cooling of the sealed edges. For example, attempts have been made to utilize chilling jaws wherein a cooling fluid, such as water, is provided to permit rapid chilling of the sealed edges of the bag. However, all of the known devices for cooling the sealed edges have involved rather complex structure and/or have created additional problems as by requiring a fluid system, thereby causing the resulting machine to be substantially expensive and mechanically complex.

A further disadvantage of the known devices has been the undesired fumes therewith smoke generated by the machine during the sealing and melting of the edges of the plastic film so adjacent as to form the bag or package. The prior devices have generally required the use of large external blower systems and the like to permit effective removal of the fumes, thereby increasing the mechanical complexity and cost of the overall apparatus.

Accordingly, it is an object of the present invention to provide an improved packaging machine capable of forming bags or packages from a plastic film, with the bag or package being heat-sealed in surrounding relationship to the contents of the bag. Particularly, it is an object of the present invention to provide an improved packaging machine which possesses an improved sealing structure for sealing the edges of the bag, which sealing structure also has means directly associated therewith for causing rapid cooling of the sealed edges of the bag and for removing the undesired smoke and fumes generated during the sealing operation.

A further object of the present invention is to provide an improved packaging machine, as aforesaid, wherein the sealing device includes opposed channel-like jaws positioned to clampingly engage the opposite sides of a plastic film and having a heated knife associated therewith for causing melting and sealing of the opposed layers of plastic film to create an edge of the bag or package. The jaws are hollow and having a continuous flow of air therethrough for rapidly cooling the sealed edges of the bag and for removing the undesirable fumes and odors generated during the sealing operation.

Still a further object of the present invention is to provide an improved packaging machine, as aforesaid, which possesses a desirable conveyor system associated therewith for permitting the articles to be continuously fed one at a time, into the partially formed bags, to permit the bags to be rapidly and sequentially formed in closed and sealed surrounding relationship to the articles.

Another object of the present invention is to provide an improved packaging machine, as aforesaid, which can successfully and efficiently operate at a rapid rate, which is of minimum mechanical complexity, which operates substantially automatically, and which requires minimum maintenance, repair and supervision.

Other objects and purposes of the present invention will be apparent to persons acquainted with devices of this type upon reading the following specification and inspecting the accompanying drawings.

Certain terminology will be used in the following description for convenience in reference only and will not be limiting. For example, the words "upwardly", "downwardly", "leftwardly" and "rightwardly" will refer to directions in the drawings to which reference is made. The word "forward" will refer to the normal direction of movement of the article and/or plastic film through the packaging machine. The words "inwardly" and "outwardly" will refer to directions toward and away from, respectively, the geometric center of the device and designated parts thereof. Said terminology will include the words above specifically mentioned, derivatives thereof and words of similar import.

SUMMARY OF THE INVENTION

In general, the objects and purposes of the present invention are met by providing a packaging machine having means thereon for supporting a roll of folded plastic film which is fed off the roll by a drive mechanism for permitting a predetermined length of film to be advanced downwardly past stationary guide structure mounted on the machine. An inlet conveyor device is associated with the stationary guide structure, and includes an elevating mechanism for permitting articles or objects to be moved, one at a time, between the overlapping layers of plastic film which partially surround the stationary guide structure. A pair of L-shaped clamping members are movably mounted on the machine directly below the stationary guide structure and are relatively movable toward one another to clamp the plastic film therebetween. An L-shaped knife having a heated blade is movably positioned within one of the clamping members and engages the film for cutting and heat-sealing a horizontal and a vertical edge of the film to permit formation of a closed and sealed plastic bag in surrounding relationship to the object. The opposed clamping members have hollow interiors which communicate with one another when the clamping members are in engagement with the plastic film. One end of one clamping member is connected to a source of air, such as the surrounding atmosphere, and the opposite end of the other clamping member is connected to a suitable blower or the like for enabling cooling air to be forced or drawn through the members and across the heated and sealed edges of the plastic film to cause rapid cooling of the sealed edges and withdrawal of the fumes and vapors generated during the sealing operation. Movement of the opposed clamping members into an open position releases the sealed bag for discharge from the machine in any convenient manner, whereupon the drive mechanism then supplies a further predetermined length of film between the clamping members to permit a further sealing operation to be performed.

DETAILED DESCRIPTION

Figure 1:
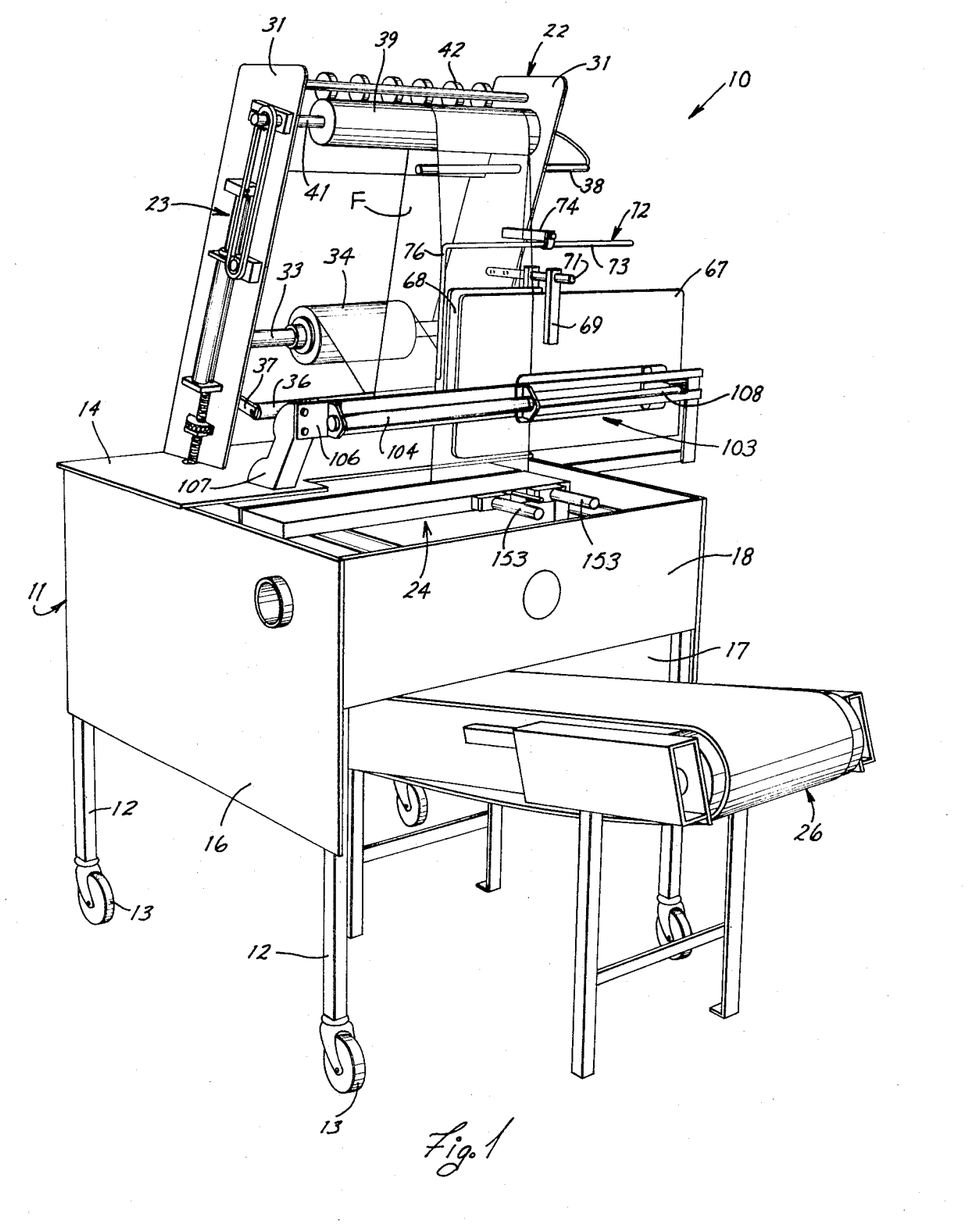
FIG. 1 is a perspective view of a packaging machine constructed according to the present invention.

FIG. 1 illustrates therein a packaging machine 10 capable of forming a closed, heat-sealed plastic bag or package in surrounding relationship to the contents thereof. The machine 10 includes a boxlike frame or housing 11 supported on a plurality of legs 12 which, in the illustrated embodiment, are provided with casters 13 thereon. The housing 11 includes opposed, substantially parallel sidewalls 16 and 17 fixedly interconnected by substantially parallel front and rear walls 18 and 19, respectively. A top wall 14 partially covers the housing 11, being positioned adjacent the rear wall 19 and extending between the opposed sidewalls 16 and 17.

The machine 10 is provided with inlet conveyor means 21 (FIG. 2) associated therewith for causing the articles or objects to be supplied, one at a time, into the packaging region. A film-supporting device 22 (FIG. 1) is positioned above the top wall 14, and a film-advancing apparatus 23 is associated with the film-supporting means 22 for causing the plastic film to be intermittently advanced during the packaging operation, thereby permit the sequential packaging of articles as they are supplied to the machine by the inlet conveyor means 22. The sealing of the articles within plastic bags is performed by a sealing means 24, which sealing means 24 performs a clamping, sealing and cutting of the plastic film. The articles as sealed within the plastic bags are then discharged from the packaging machine 10, as by use of a conventional discharge conveyor 26.

Figure 4:
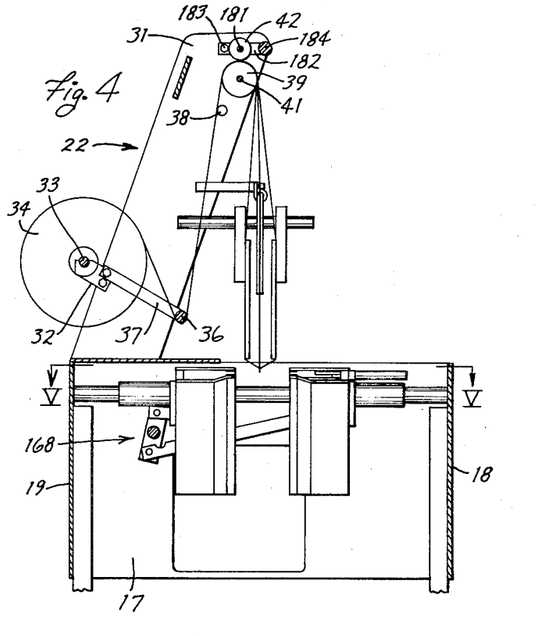
FIG. 4 is a sectional elevational view of the packaging machine, same being taken on a reduced scale substantially in a vertical plane containing therein the central longitudinally extending axis of the machine.
Figure 5:
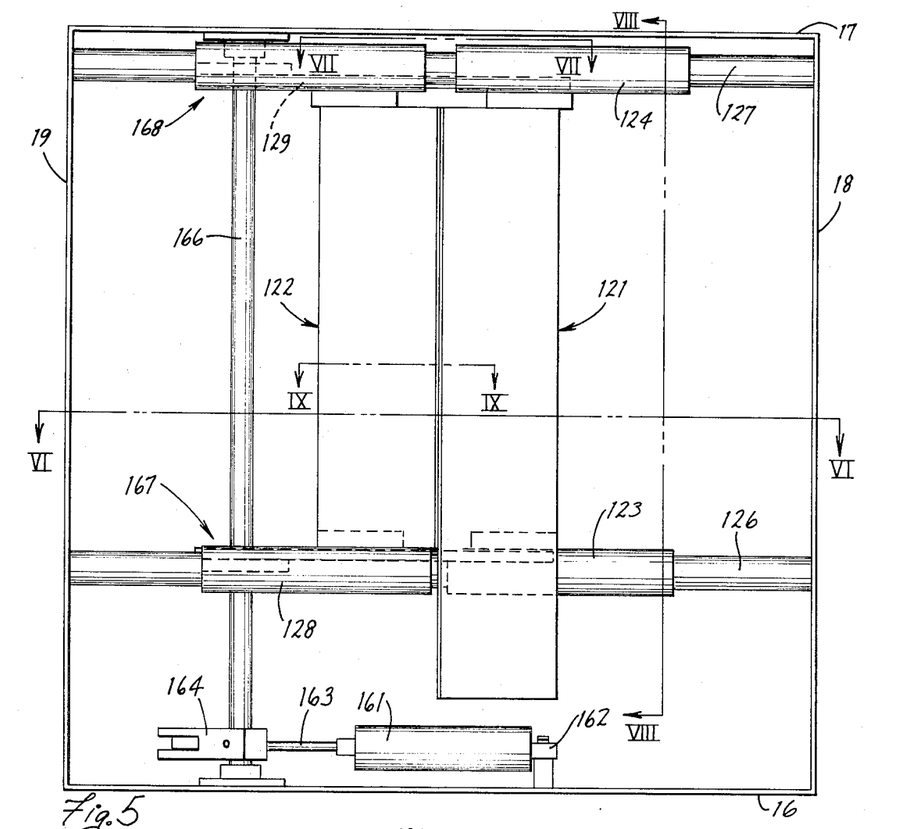
FIG. 5 is an enlarged plan view of the components contained within the machine housing, as taken tially along the line V—V in FIG. 4.

The film-supporting means 21, as illustrated in FIGS. 1 and 4, includes a pair of parallel support plates 31 fixedly secured to and extending upwardly from the top wall 14. A pair of brackets 32 are fixedly secured to the plates 31 and extend rearwardly thereof, which brackets 32 rotatably support thereon a removable shaft 33 which extends between the plates 31. The shaft 33 extends through the core of a roll of plastic film 23 for permitting rotatable support of same. The film F of the roll 34 is longitudinally folded midway between its sides, which film in its folded form is then fed from the roll 34 for utilization in the packaging machine 10. The folded film F as withdrawn from the roll 34 passes beneath a tensioning roller 36 which extends between and is rotatably supported on the free ends of a pair of levers 37, which levers are pivotally supported adjacent their other ends on the support plates 31. The film F extends upwardly from the tensioning roller 36 and slidably passes over a probe 38 which removes the static electricity of the film. The film then passes over a drive roller 39 which extends between the support plates 31 adjacent the upper ends thereof, with the film then extending downwardly so as to be supplied to the sealing means 24.

To permit positive driving and advancing of the film, a plurality of guide rollers 42 are rotatably supported on a shaft 181 (FIG. 4) which extends between a pair of levers 182 which are pivoted at 183 to the support plates 31. A weight 184 extends between the free ends of levers 182 so that the guide rollers maintain film F in snug engagement with drive roller 39 to prevent film slippage. The rollers 42 and shaft 181 are swingable away from roller 39 to permit a film to be easily loaded into the machine.

Figures 12, 13, 14:
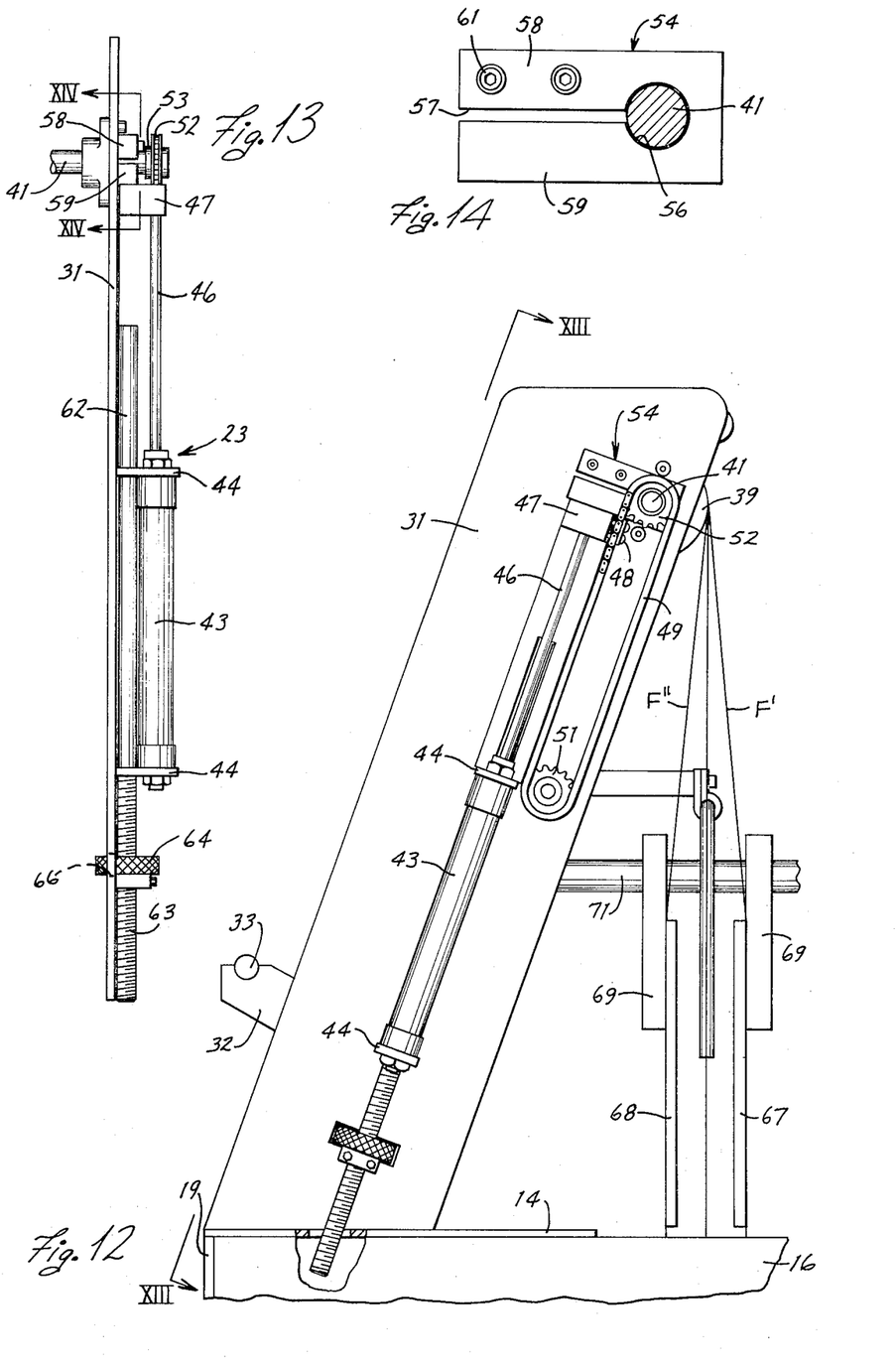
FIG. 12 is an enlarged, side elevational view of the upper part of the packaging machine and illustrating therein the advancing and driving mechanism for the plastic film.
FIG. 13 is a fragmentary view of the advancing mechanism as taken along the line XIII—XIII in FIG. 12.
FIG. 14 is an enlarged view taken along the line XIV—XIV in FIG. 13.

The shaft 41 of the drive roller 39 is driven by the film-advancing apparatus 23 which, as illustrated in FIGS. 12-14, includes a fluid pressure cylinder 43, such as a double-acting penumatic cylinder, which is mounted directly adjacent the support plate 31 by a pair of spaced brackets 44. A piston rod 46 slidably extends from the cylinder 43 and has the upper end thereof fixedly connected to a slide block 47 which is slidably movable along the external surface of the support plate 31. Block 47 is connected by means of a suitable connecting structure 48 to the links of a chain 49 for causing movement of the chain 49 in response to reciprocating movement of the piston rod 46. The chain 49 is supported on an idler sprocket 51 and is also disposed in engagement with a drive sprocket 52. Drive sprocket 52 is associated with a one-way clutch mechanism 53 which coacts with the exposed end of the drive shaft 41. The one-way clutch mechanism 53 causes rotation of the shaft 41 and roller 39 to cause advancing of the plastic film F when the piston rod 46 is being extended. However, the clutch 52 permits retraction of the piston rod 46 without causing any return rotational movement of the shaft 41.

To permit overrunning of the shaft 41 when the piston 46 reaches its fully extended position, which overrunning would normaly be permitted due to the one-way clutch 52, there is provided a braking device in the form of a brake block 54 disposed for coaction between the shaft 41 and the slide block 47. The brake block 54, as illustrated in FIG. 14, is provided with a slot or slit 57 therein which terminates in a central opening 56, which opening is adapted to receive therein the drive shaft 41. The split 57 also results in the formation of opposed legs 58 and 59, with the leg 58 being fixedly secured to the support plate 31, as by means of screws 61. The other leg 59 is disposed in the path of travel of the slide block 47. The legs 58 and 59, when the block 54 is in a relaxed condition, are normally spaced from one another, substantially as illustrated in FIG. 14, whereupon the opening 56 is thus slightly larger than the diameter of the shaft 41 to permit the shaft 41 to freely rotate within the opening 56. However, when the piston rod 46 approaches its fully extended position, slide block 47 contacts the leg 59 causing same to be elastically deformed toward the stationary leg 58, which thus results in a contraction of the opening 56 so that brake block 54 applies a frictional drag or torque on the shaft 41, thereby stopping the shaft 41 to prevent overrunning of the film.

The film advancing apparatus 23 also includes a suitable stop structure associated therwith for permitting the length of film advanced during each cycle to be selectively varied. For this purpose, there is provided an elongated stop rod 62 disposed adjacnet the support plate 31 and slidably supported on the spaced brackets 44. The lower portion 63 of rod 62 is threaded and has a rotatable nut 64 threadedly disposed thereon. The nut 64 extends through a slot 66 as formed in the support plate 31, whereupon the nut 64 is prevented from being displaced axially along the rod 62 so that rotation of nut 64 thus causes axial displacement of the rod 62 relative to the cylinder 43. The upper end of the stop rod 63 is disposed so as to be contacted by the slide block 47 when the piston rod 46 is retracted, thereby limiting the retraction of the piston rod 46 and of the chain 49.

Figure 3:
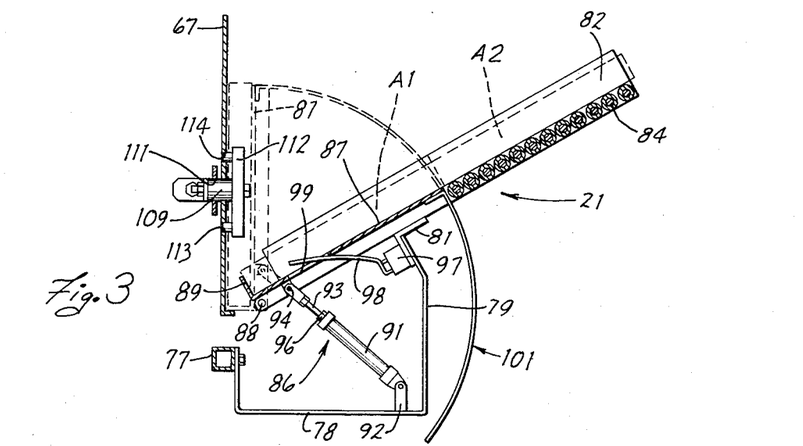
FIG. 3 is a side sectional view of the inlet elevator apparatus.
Figure 3A:
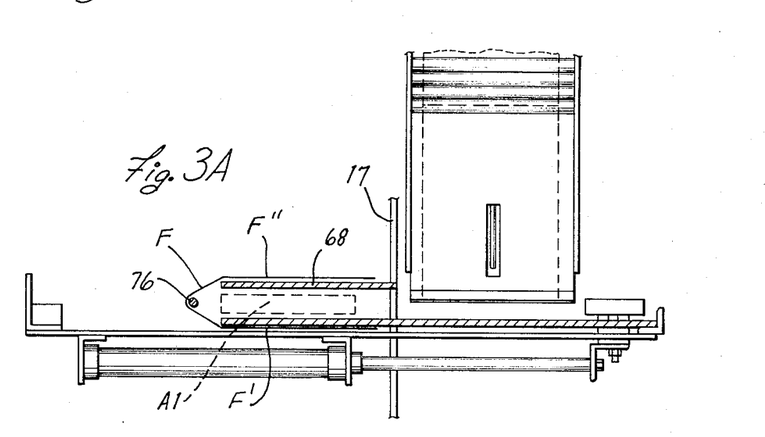
FIG. 3A is a fragmentary sectional view taken along the line IIIA—IIIA in FIG. 2.

The folded film F after passing over the drive roller 39 is moved past a pair of stationary guide plates 67 and 68 which cause the overlapping layers of film F' and F'' to separate, the film layers F' and F'' being positioned to slidably pass over the outer surfaces of the plates 67 and 68, respectively, as illustrated in FIG. 3A. The guide plates 67 and 68 are stationarily positioned directly over the housing 11 and are fixedly secured to suitable support bars 69, which support bars 69 are in turn fixedly secured to a support rod 71 which is anchored to and extends outwardly from the adjacent support plate 31. The guide plates 67 and 68 are maintained in parallel relationship to one another and are spaced apart by a distance sufficient to accommodate therebetween the particular article or object which is to be packaged.

To further assist in separating the film layers F' and F'', there is also provided a substantially L-shaped guide rod 72 which includes a substantially horizontal leg portion 73 positioned above the guide plates 67 and 68 and suitably anchored to the adjacent support plate 31 by means of a mounting bracket 74. The guide rod 72 has a vertical leg portion 76 which extends downwardly from the inner end of the horizontal leg portion 73, the vertical leg portion 76 being spaced inwardly from the inner edges of the guide plates 67 and 68 and being positioned to slidably support the plastic film F in the region of the longitudinal fold thereof as illustrated in FIGS. 1 and 3A.

The guide plates 67 and 68, by being spaced apart, define a predetermined clearance space therebetween which enables the objects or articles to be slidably pushed therethrough so as to be disposed between the overlapping layers F' and F'' of the film F. For this purpose, the front guide plate 67 has a width substantially greater than the rear guide plate 68 (see FIG. 3A) and extend laterally beyond the sidewall 17 so as to project in front of the inlet conveyor means 21.

The inlet conveyor means 21 (FIGS. 2 and 3) is supported on the housing 12 by a substantially Z-shaped frame member 77 which projects outwardly away from the sidewall 17 and has one leg thereof fixedly secured to the sidewall 17. A further substantially U-shaped frame member 78 is fixedly secured to the frame member 77 and projects rearwardly in substantially parallel and spaced relationship to the sidewall 17. The U-shaped frame member 78 has an upwardly projecting rear leg 79 which at its upper end is fixedly secured to an angle member 81 which extends between and fixedly supports a pair of opposed and substantially parallel guide rails 82 and 83. The guide rails 82 and 83 extend at an angle relative to the horizontal plane and are fixedly interconnected by a plurality of conventional conveyor rolls 84 adjacent the upper ends thereof.

Figure 2:
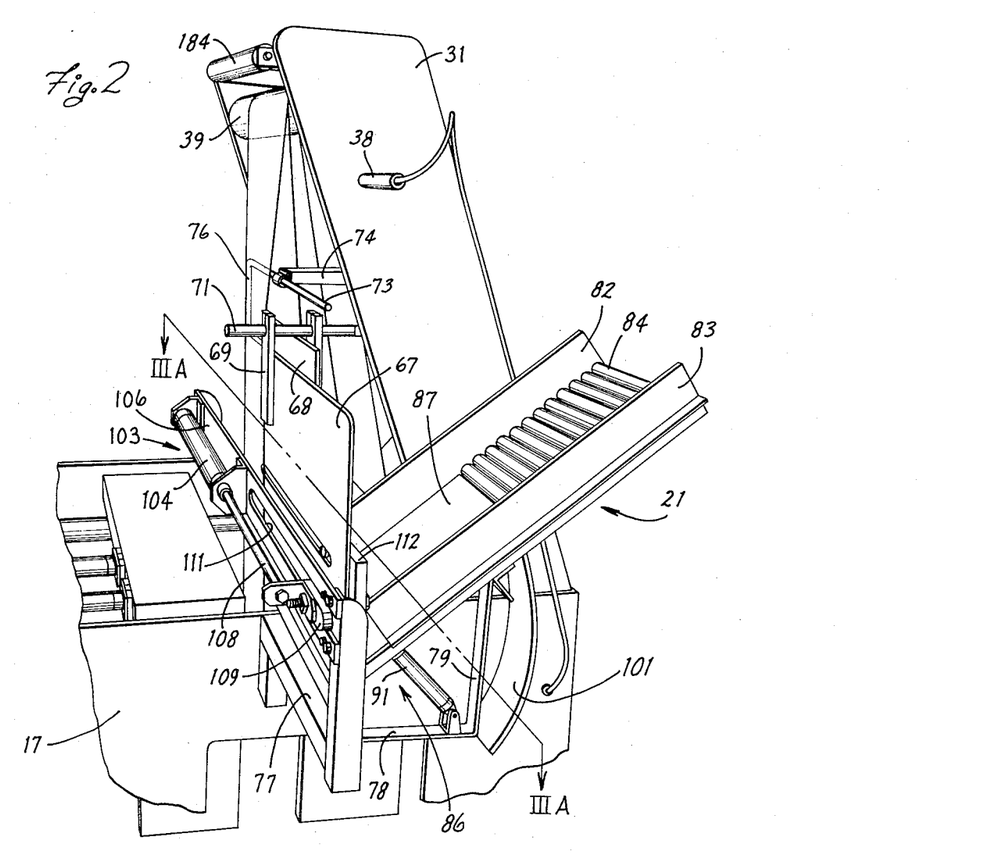
FIG. 2 is a fragmentary perspective view illustrating the inlet elevator apparatus as provided on the packaging machine of the present invention.

The inlet conveyor means 21 also has an elevator device 86 associated therewith, which device includes a platelike platform 87 disposed between the guide rails 82 and 83 and positioned for pivotal movement relative thereto. The upper end of the platelike platform 87 terminates adjacent the lowermost of the conveyor rolls 84, with the platform 87 being substantially coplanar with the uppermost surfaces of the rolls 84. The lower edge of the platform 87, as positioned adjacent the front guide plate 67, is pivotally supported on the guide rails 82 and 83 by means of the pivot pin 88. The platform 87 also has a substantially perpendicular retaining flange 89 extending upwardly therefrom adjacent its lower edge.

The platform 87 is pivotally swingable from a first position (as illustrated by solid lines in FIGS. 2 and 3) wherein it receives an object or article thereon, into a second position (as illustrated by dotted lines in FIG. 3) wherein the platform is substantially vertical and spaced from the guide plate 67 so as to position the article or object in alignment with the space between the guide plates 67 and 68. To enable the platform 87 to be swingably moved between these two positions, the elevator device 86 is provided with a power device which, in the illustrated embodiment, comprises a fluid pressure cylinder 91, which cylinder is preferably a double-acting pneumatic cylinder. The lower end of the cylinder housing is pivotally supported on a bracket 92, and a piston rod 93 extends from the upper end of the cylinder housing and is pivotally connected to the platform 87 by a pivot 94. The piston rod 93 is provided with a conventional stop nut 96 thereon for limiting the retracted position of the piston rod.

The energization of the pressure cylinder 91 is controlled by means of a limit switch 97 mounted on the angle member 81, which limit switch has an elongated leverlike actuator 98 pivotally mounted for controlling actuation thereof. The leverlike actuator 98 extends upwardly into an elongated slot 99 formed in the platform 87 so as to maintain the cylinder 91 in its retracted position when the actuator 98 is in the position illustrated in FIG. 3. However, when an object or article is present on the platform 87, the platform 98 is depressed so that cylinder 91 is activated causing extension of piston rod 93 so as to move the platform 87 into its vertical position as illustrated by dotted lines in FIG. 3.

To prevent further articles or objects from being moved forward along the rolls 84 when the elevator platform 87 is in its raised vertical position, there is provided a stop plate 101 fixedly secured to the underside of the platform 87 adjacent its upper edge, which plate 101 is in the form of a circular arc generated substantially about the pivot 88. The plate 101 is of sufficient arcuate extent that the lower free end thereof remains below the plane defined by the upper surfaces of the rolls 84 when the platform 87 is in its raised vertical position.

The article or object, when disposed between the guide plate 67 and the raised platform 87, is slid laterally inwardly so as to be disposed between the film layers F' and F'' by means of a reciprocating feed mechanism generally designated by the reference numeral 103 (FIG. 2). The feed mechanism 103 includes a fluid pressure cylinder 104, preferably a double acting pneumatic cylinder, mounted on a stationary support plate 106 which is fixedly secured to the top housing wall 14, as by means of an intermediate pedestal 107 (FIG. 1). The fluid pressure cylinder 103, which is disposed horizontally and extends substantially transversely across the machine, has a reciprocating piston rod 108 which slidably extends therefrom in substantially parallel relationship with the guide plate 67. The free end of piston rod 108 is fixedly secured to a guide block 109 which is slidably disposed within an elongated slot 111 formed in the guide plate 67. The guide block 109 extends through the slot 111 and is fixedly secured to a blocklike pusher 112 which is positioned adjacent the other side of the guide plate 67. The pusher 112 is disposed so as to be rectilinearly movable between the guide plate 67 and the elevator platform 87. The pusher 112, when the piston rod 108 is fully extended, is disposed closely adjacent the outer edge of the guide plate 67 and is positioned outwardly from the outer guide rail 83. The rectilinear movement of the pusher 112 is further guided by means of additional guide pins 113 provided thereon, which guide pins extend into further elongated guide slots 114 as formed in the guide plate 67.

Considering now the sealing means 31 (FIGS. 4–10), same includes a pair of slidable L-shaped clamping members or jaws 121 and 122 positioned for movement toward and away from one another to enable engagement with opposite sides of the plastic film as it is suspended therebetween. The jaw 121 has a pair of guide sleeves 123 and 124 fixedly secured thereto, which guide sleeves are slidably supported on a pair of elongated and substantially parallel guide rods 126 and 127 which are fixedly secured to and extend between the front and rear walls 18 and 19, respectively. The other slidable jaw 22 is also provided with a pair of guide sleeves 128 and 129 fixedly secured thereto, which guide sleeves in turn are slidably supported on the guide rods 126 and 127, respectively.

The L-shaped jaw 121 (FIG. 8) includes an elongated horizontal jaw portion 131 which extends across the width of the machine, with one end of the horizontal jaw portion 131 being fixedly connected to an elongated vertical jaw portion 132 which extends downwardly adjacent the sidewall 17. The horizontal jaw portion 131 is of a substantially channel-shaped configuration (FIG. 8) and includes opposed top and bottom walls 133 and 134, respectively, which walls have their free edges positioned closely adjacent one another to define elongated and substantially parallel clamping portions 136 which are spaced from one another by a predetermined clearance space 137 therebetween. A resilient sealing element 138 is fixedly secured to and extends longitudinally along the free edge of each clamping portion 136.

Figure 10:
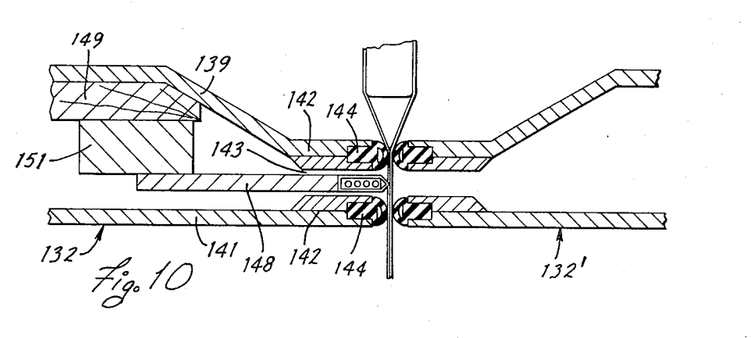
FIG. 10 is an enlarged, fragmentary, sectional view taken substantially along the line X—X in FIG. 7 and illustrating the clamping members in the closed position.

The vertical leg portion 132 is also of a channel-shaped configuration and has the interior thereof in open communication with the interior of the horizontal leg portion 131. The cross-sectional configuration of the vertical leg portion 132 is, as illustrated in FIG. 10, substantially identical to the cross-section of the horizontal leg portion 131 and includes opposed wall portions 139 and 141 which have their free edges positioned closely adjacent one another and formed as clamping portions 142 which are spaced from one another by a predetermined clearance space 143. The spacing between the clamping portions 136 of the horizontal leg portion 131 is preferably substantially equal to the spacing between the clamping portions 142 of the vertical leg portion 132. Also, elongated resilient sealing elements 144 extend longitudinally along the free edges of the clamping portions 142 in a manner similar to the sealing elements 138.

The jaw 122 is substantially identical to the jaw 121, as described above, except that the jaw 122 is substantially a mirror image of the jaw 121. Thus, the parts of the jaw 122 have been designated by the same reference numerals used to designate the corresponding parts of the jaw 121 except that the numerals have been additionally identified by the utilization of a prime notation. Briefly, the jaw 122 also includes elongated horizontal and vertical jaw portions 131' and 132', respectively, which jaw portions are each of a substantially channel-shaped configuration disposed in open communication with one another and having clamping portions and resilient seals along the free edges thereof, whereupon the horizontal and vertical jaw portions of the slidable jaw 122 move into abutting, clamping and sealing engagement with the horizontal and vertical jaw portions, respectively, of the jaw 121 when the jaws are slidably moved toward one another into the closed clamping position illustrated in FIGS. 5–10.

Figures 8, 9:
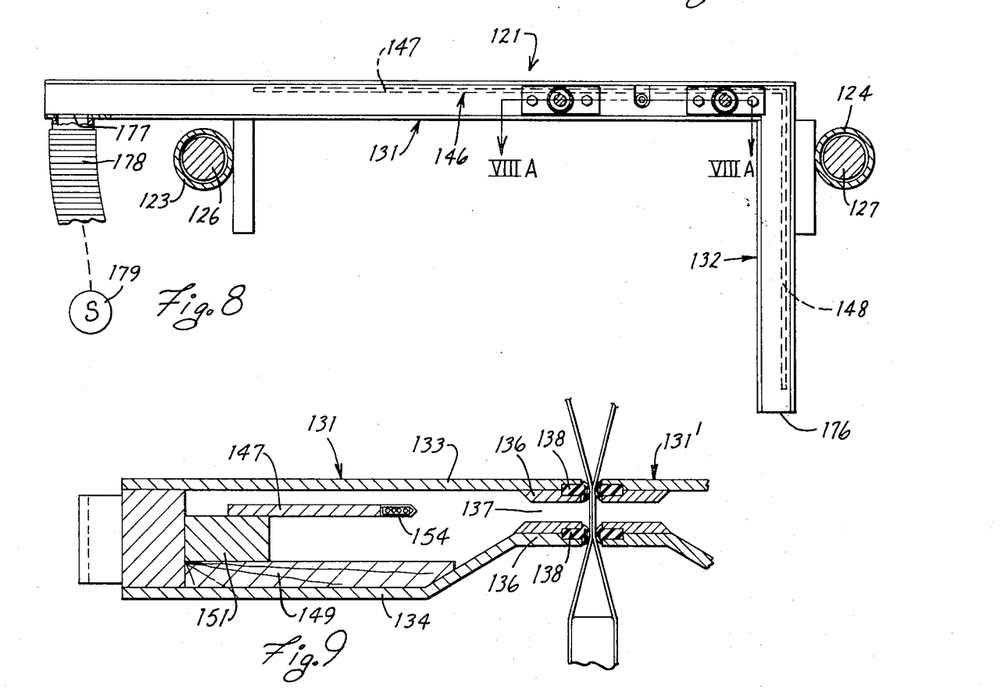
FIG. 8 is a sectional view taken substantially along the line VIII—VIII in FIG. 5.
FIG. 9 is an enlarged, fragmentary, sectional view taken substantially along the line IX—IX in FIG. 5 and illustrating the clamping members in the closed position.
Figure 8A:
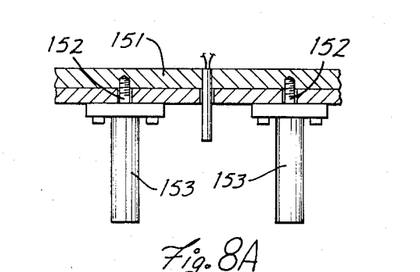
FIG. 8A is an enlarged, fragmentary, sectional view taken along the line VIIIA—VIIIA in FIG. 8.

To permit sealing and cutting of the plastic film, the jaw 121 is also provided with a sealing knife or burn-off blade 146 therein, which knife is of a substantially L-shaped configuration and includes an elongated horizontal leg portion 147 disposed within the horizontal jaw portion 131, and an elongated vertical leg portion 148 disposed within the vertical jaw portion 132. The knife 146 is slidably supported within the jaw 122 by means of a stationary guide block 149 as provided adjacent the lower wall of the horizontal jaw portion 131. The guide block 149 slidably supports thereon a slide member 151 to which is fixedly secured the horizontal leg 147 of the knife 146. The slide block 151 is fixedly secured to the extended ends of a pair of reciprocating plungers 152 (FIG. 8A) of a pair of fluid pressure cylinders 153 which are mounted on the jaw 121. Energization of cylinders 153 so as to cause extension of the plungers 152 causes the knife 146 to be slidably moved forward so as to enter into the clearance spaces 137 and 143 to enable the free edge of the knife to engage the plastic film which is clampingly held between the jaws 121 and 122.

Figure 11:
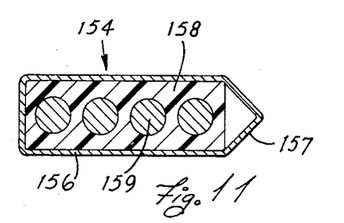
FIG. 11 is an enlarged, cross-sectional view of the heating element as provided on the forward edge of the sealing knife.

The knife 146 is provided with a heating element 154 fixedly secured and extending along the free edge thereof, which heating element 154 (see FIG. 11) includes a rectangular boxlike housing 156 having a tapered V-shaped cutting edge 157 formed on the forward edge thereof. A block of ceramic insulating material 158 is positioned within the interior of the housing 156 and surrounds a plurality of elongated conductors extending therethrough, such as a plurality of nickel chromium wires 159. The wires 159 are connected to a suitable source of electrical potential to enable the heating element 154 to be maintained at the temperature necessary to facilitate melting of the plastic film to effect the formation of the sealed edges of a bag.

To permit slidable displacement of the jaws 121 and 122, there is provided a power source in the form of a fluid pressure cylinder 161, preferably a double-acting pneumatic cylinder, which has the rearward end of the cylinder housing pivoted at 162 to the housing sidewall 16. The piston rod 163 slidably extends from the other end of the cylinder housing and is pivotally connected to the forked lever 164 which is nonrotatably secured to a shaft 166. The shaft 166 is rotatably supported on and extends between the sidewalls 16 and 17 and is drivingly interconnected to the jaws 121 and 122 by a pair of linkages 167 and 168 disposed adjacent the opposite ends of the jaws. The linkages 167 and 168 are identical and thus only the linkage 168 will be described in detail.

Figure 6:
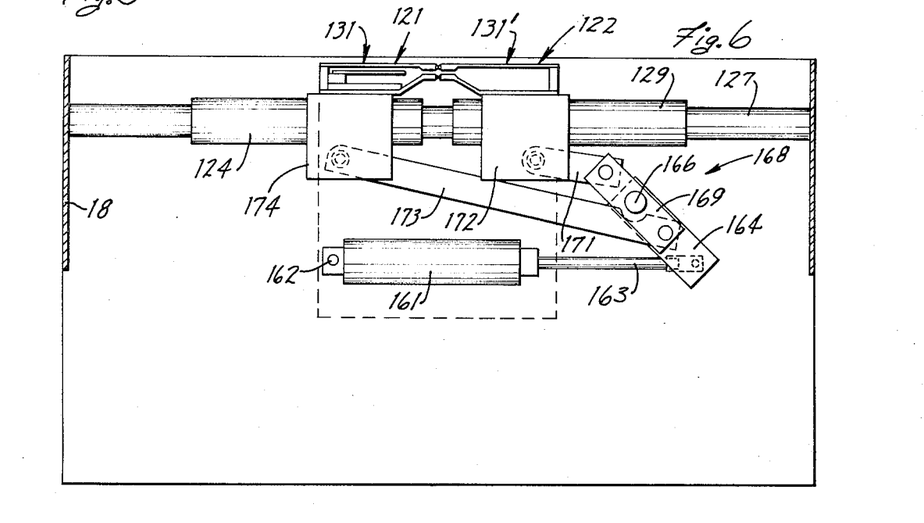
FIG. 6 is a sectional elevational view taken substantially along the line VI—VI in FIG. 5.
Figure 7:
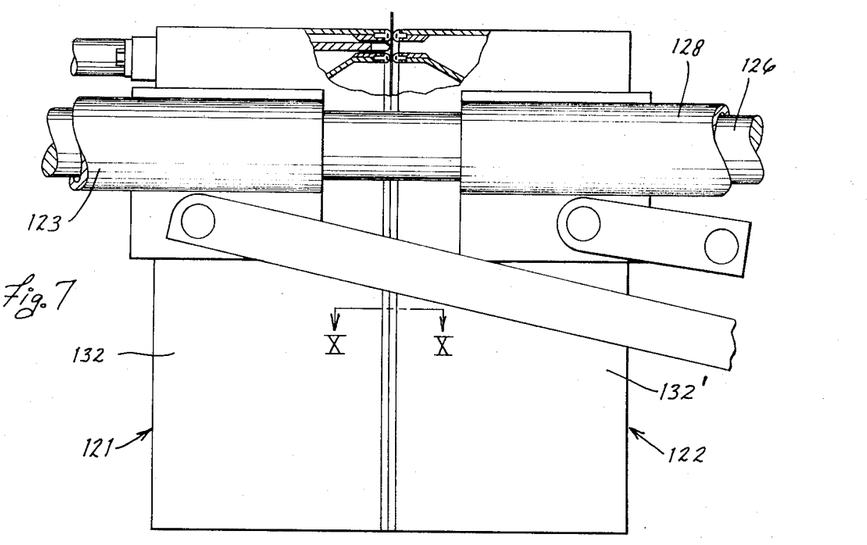
FIG. 7 is a sectional elevational view taken substantially along the line VII—VII in FIG. 5.

The drive linkage 168, as illustrated in FIG. 6, includes a lever 169 nonrotatably secured to the shaft 166. The lever 169, which has its central portion nonrotatably secured to the shaft 166, has one end thereof pivotally connected to a first link 171, which link 171 in turn is pivotally connected at its outer end to a support block 172 which is fixedly connected between the jaw 122 and the guide sleeve 129. The other end of the lever 169 is pivotally connected to a second link 173 which, at its other end, is pivotally connected to a further support block 174 fixedly connected between the jaw 121 and the guide sleeve 124. The links 171 and 173, as illustrated in FIG. 6, are pivotally connected to the lever 169 at points which are disposed on substantially diametrically opposite sides of the shaft 166 and are substantially equally spaced from the axis of the shaft whereby angular displacement of the shaft 166 and lever 169 causes the jaws 121 and 122, through the intermediate links 171 and 173, to be linearly moved in opposite directions.

The jaws 121 and 122 are also provided with suitable openings or passages associated with the interior thereof for enabling a gaseous fluid, such as air, to be drawn therethrough. For this purpose, the lower ends of the vertical jaw portions 132 and 132' are provided with openings 176 (FIG. 8) which provide communication between the interior of the jaws and the surrounding environment. A further opening 177 is provided in the jaw 121 at the end of the horizontal jaw portion 131 opposite the vertical jaw portion 132. A suitable conduit, such as a flexible hose 178, is connected to the opening 177, which hose 178 is in turn connected to a suitable suction source or blower 179 for causing air to be drawn into the openings 176 and through the hollow interiors of the jaws 121 and 122 for discharge through the flexible hose 178.

OPERATION

The operation of the packaging machine constructed according to the present invention will be briefly described to insure a complete understanding thereof.

To initiate operation of the packaging machine 10, the plastic film F is first fed around the drive roller 39 and then downwardly past the guide plates 67 and 68 so that the overlapped layers F' and F'' are spaced from one another, with the film then being suspended downwardly so as to pass between the opened jaws 121 and 122. The fluid pressure cylinder 161 is then energized to cause extension of the piston rod 163 to move the jaws 121 and 122 toward one another in clamping engagement with the plastic film suspended therebetween. The fluid pressure cylinders 153 are then energized to cause the sealing knife 146 to slidably move inwardly toward the plastic film, whereupon the heating element 154 melts and effectively cuts the plastic film and results in the formation of a sealed edge extending horizontally across the lower end of the suspended film. This sealed edge constitutes the lower sealed edge of the bag which will be subsequently formed. The cylinder 161 and the cylinders 153 are then energized in the reverse direction to retract the heating knife 146 and to again move the jaws 121 and 122 into their open positions. The packaging machine 10 is thus in condition to initiate the forming of sealed packages in surrounding relationship to an article or object.

The articles which are to be packaged are supplied by any conventional means, such as a conveyor or the like, to the inlet conveyor means 21. The articles are sized so as to extend substantially the full length of the elevator platform 87, such as illustrated by the article designated A1 in FIG. 3, so that when the platform 87 is moved into its vertical position, the stop plate 101 will prevent the next article designated A2 from moving downwardly into the region vacated by the elevator platform. When the elevator platform is raised into its vertical position, the retaining tab 89 swings downwardly so as to overlap a flange formed on the lower edge of the guide plate 67, whereupon the article A1 is thus disposed vertically between the guide plate 67 and the elevator platform 87. The cylinder 104 is then energized to cause retraction of the piston rod 108, whereupon the pusher 112 engages the article A1 and slides same horizontally into the space defined between the guide plates 67 and 68, the article being slidably moved inwardly until it is positioned directly adjacent the vertical leg portion 76 of the L-shaped guide rod 72. The article A1 when disposed as illustrated in FIG. 3A, is prevented from falling downwardly through the machine due to the sealed edge as previously formed on the lower edge of the plastic film, as described above. The fluid pressure cylinder 104 is then pressurized in the opposite direction to again extend the piston rod 108 to thus move the pusher 112 back into its fully extended position. Likewise, the pressure cylinder 91 is energized in the opposite direction to return the elevator platform 87 into its lowered position to enable the next article A2 to slide down into engagement with the retaining flange 89.

After the article A1 has been moved into the position illustrated in FIG. 3A wherein it is disposed between the overlapped layers F' and F'' of the plastic film, then the fluid pressure cylinder 43 is energized to cause extension of the piston rod 46 which drives the chain 49 and rotates the drive sprocket 52, which through the intermediate one-way clutch 53 causes a predetermined rotation of the drive roller 39. This thus results in a predetermined quantity of film being withdrawn from the roll 34, with the film F which suspends downwardly from the drive roller 39 being moved past the guide plates 68 and 69, which movement is facilitated by the weight of the article A1 supported within the film. The film is advanced by a distance sufficient to result in the article A1 being moved downwardly past the open jaws 121 and 122 so as to be suspended therebelow. After the film has been moved said predetermined amount, the slide block 47 secured to the piston block 46 contacts the brake block 54 to positively stop the drive shaft 41, thereby preventing overrunning of the drive shaft to thus insure that the film is moved through only said predetermined distance. The cylinder 43 is then energized in a reverse direction to retract the piston rod 46 to again place same in its initial position, which movement has no effect on the drive shaft 41 due to the intermediate one-way clutch 53.

With the article A1 disposed between the film layers F' and F'' and suspended below the open jaws 121 and 122, the fluid pressure cylinder 161 is again actuated to cause extension of the piston rod 163, whereupon the jaws 121 and 122 are linearly moved toward one another into a closed position wherein the jaws sealingly abut one another and clampingly engage the plastic film. The plastic film is engaged not only between the opposed horizontal jaw portions 131 and 131', but is also engaged along the open vertical edge thereof by the vertical jaw portions 132 and 132'. The pressure cylinders 153 are then energized to cause the sealing knife 146 to slide forwardly so that the heating element 154 contacts the plastic film. The heating element thus results in the overlapped and adjacent film layers F' and F'' to be sealed together in the vicinity between the opposed horizontal jaw portions 131 and 131', thereby sealing the upper edge of the bag. Also, the horizontal portion 147 of the sealing knife 146 also results in the bag being severed from the film which is suspended from the drive roller 39. Further, the vertical leg portion 148 of the sealing knife 146 contacts the overlapping film layers F' and F'' adjacent the vertical free edges thereof due to the engagement of the vertical jaw portion 132 and 132', thereby resulting in a sealing of the vertical edge of the bag. Since the bottom edge of the bag was previously sealed, and inasmuch as the opposite vertical edge of the bag is formed by the longitudinal fold of the plastic film, the article A1 is thus completely sealed within a plastic bag or package and is likewise severed from the roll of plastic film. The packaged article, upon being severed, si then deposited on a suitable discharge device, such as a discharge hopper or conveyor 26, for permitting transporting of the packaged article to a suitable storage or discharge location.

During the above-described sealing operation, the blower or suction device 179 causes air to be drawn into the hollow interiors of the jaws 121 and 122 for removing the fumes and vapors, and for quickly cooling the melted and sealed edges of the plastic. Particularly, the opening 176 allows air to be drawn into and through the hollow interior of the jaw 121. Further, as soon as the plastic film has been heated and severed by the heating knife 146, the suction device 179 also causes air to enter into the bottom opening 176 of the other jaw 122, which air passes into the interior of the jaw 122 and then passes through the clearances spaces 143 and 137 into the hollow interior of the jaw 121, whereupon the air is then discharged through the opening 177 and the flexible hose 178. As the air is moved through the clearance spaces 143 and 137 from the interior of the jaw 122 into the interior of the jaw 121, the cool air comes into direct contact with the severed edges of the plastic film and the plastic bag, which severed edges have just been heated, melted, severed and sealed. This cool air is effective in rapidly cooling the newly sealed edges to permit the edges to obtain their full strength in a very short period of time. Further, not only does this flow of air remove the heat from the edges of the plastic, but it also removes the heat, vapors and fumes generated during the sealing process.

Further, if desired, an additional suction device can be disposed adjacent the area of engagement between the vertical jaw portions 132 and 132' so as to collect the narrow strip of plastic film which is severed from the edges of the film sheet when the free edges of the overlapping layers of film are sealed.

While all of the description as set forth above has made reference to the sealing of an object or article within a plastic bag, the work "object" or "article" is being used to encompass not only the situation wherein a single article is being sealed within the bag, but is also being used to encompass the situation wherein several articles are being sealingly enclosed within a single bag. For example, the packaging machine of the present invention can be successfully utilized for sealingly enclosing a stack of disposable dishes, such as plates or the like, with a predetermined number of said dishes being disposed within each stack which is to be sealed within each bag.

Although a particular preferred embodiment of the invention has been disclosed in detail for illustrative purposes, it will be recognized that variations or modifications of the disclosed apparatus, including the rearrangement of parts, lie within the scope of the invention.

I claim:

1. An article packaging apparatus for use in combination with a longitudinally folded web of heat-sealable material, wherein the opposite sides of the web are disposed in confronting relationship with each other, the apparatus comprising:
  a frame;
  means on the frame for feeding a predetermined length of the web with the opposite sides in confronting relationship with each other;
  clamping means for clamping the opposite sides of the web together and including a pair of opposed L-shaped clamping members each disposed adjacent the web and in confronting relationship with one side thereof, each clamping member including a pair of spaced and substantially parallel clamping portions rigidly interconnected with each other, the clamping portions of the opposed clamping member being spaced from each other to define therebetween an unobstructed space through which the web extends when clamped to be severed and sealed;

means on the frame mounting and moving said clamping means toward and away from one another;

a burn-off blade lying in the unobstructed space between the pair of clamping portions of one of said clamping members and movable through the space into engagement with the web to burn off and seal the means moving the burn-off blade into and out of engagement with the web;

each of said L-shaped clamping members being substantially hollow throughout the interior thereof and one of said L-shaped jaws having an opening adjacent one end thereof; and means connected to the other L-shaped jaw adjacent the other end thereof for drawing air into said opening and through the interior of said one L-shaped clamping member, and across and through the space between the opposed clamping portions into the other L-shaped clamping member for discharge from said other end, whereby the air contacts and cools the sealed edges and removes the fumes and vapors.

2. A packaging machine according to claim 1, wherein each of said L-shaped clamping members includes an elongated horizontal leg portion and an elongated vertical leg portion fixedly connected to and extending downwardly from one end of said horizontal leg portion, the lower end of the vertical leg portion of said one clamping member having an opening therein providing communication between the interior of said one clamping member and the surrounding environment, and suction means communicating with the horizontal leg portion of said other clamping member adjacent the end thereof opposite the vertical leg portion for causing air to be drawn in said opening and through the clamping portions after burn-off of the web.

3. A packaging machine according to claim 1, wherein the feeding means includes brake means associated therewith for preventing overrunning of the web.

4. A packaging machine according to claim 1, wherein said feeding means includes power means mounted on said frame, a drive shaft rotatably supported on said frame and disposed in driving engagement with said web, and one-way clutch means coacting between said power means and said drive shaft whereby said drive shaft is driven in response to energization of said power means, and brake means associated with said shaft for preventing overrunning thereof after said power means has moved through a predetermined distance.

5. A packaging machine according to claim 4, wherein said brake means includes a resilient brake block normally rotatably supported on said shaft, and said power means including a reciprocating member having a slide block positioned to engage said brake block to cause same to clampingly engage and nonrotatably hold said drive shaft after said slide block has been moved through said predetermined distance.

6. A packaging machine according to claim 1, further including guide means associated with said web for causing the opposite sides of said web to be spaced from one another, said guide means including a pair of substantially parallel and vertically oriented guide plates positioned between the overlapping layers of said web for maintaining said layers a predetermined distance apart, said guide plates being disposed directly above said clamping members.

7. A packaging machine according to claim 6, further including a feeding device associated with said guide plates for causing objects to be positioned between said guide plates, said feeding device including inlet conveyor means having an elevating device associated therewith for elevating an object into a substantially vertically oriented position wherein the object is substantially horizontally aligned with the space between said guide plates, and means providing communication between the elevator device and the guide plates for causing the object to be horizontally transferred into the space directly between said guide plates.

8. A packaging machine according to claim 7, wherein the inlet conveyor means includes an inclined chute including a guide member extending at least partially in the horizontal direction, the end of said chute terminating adjacent the guide plates, said elevating device including an elevating platform mounted for pivotal movement between a first position when same is substantially aligned with said chute and a second position wherein same is substantially vertically aligned with said guide plates, and said transfer means including a power driven reciprocating pusher member aligned with and spaced between said guide plates and positioned for engaging the article on the elevating device when same is in said second position for sliding same horizontally from the elevating device into the space between said guide plates.

9. A packaging machine according to claim 8, wherein the means for moving the burn-off blade includes a pair of fluid pressure cylinders mounted on one of said clamping members, said fluid pressure cylinders having extendible piston rods connected to said burn-off blade for reciprocating same relative to said one clamping member.

10. A packaging machine according to claim 1, wherein each of said L-shaped clamping members includes an elongated horizontal leg portion and an elongated vertical leg portion fixedly connected to and extending downwardly from its respective horizontal leg portion, the horizontal and vertical leg portions of each of said jaw members having a substantially channel-shaped cross-section so as to define a hollow interior, the hollow interior of the horizontal and vertical leg portions of each of said clamping members being in open and continuous communication with one another.

* * * * *